(12) United States Patent
Ueno et al.

(10) Patent No.: US 7,277,255 B2
(45) Date of Patent: Oct. 2, 2007

(54) HEAD SLIDER WITH POSITIVE DYNAMIC PRESSURE GENERATING SECTION

(75) Inventors: Yoshihiro Ueno, Hirakata (JP); Zhisheng Deng, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 414 days.

(21) Appl. No.: 10/967,272

(22) Filed: Oct. 19, 2004

(65) Prior Publication Data

US 2005/0105216 A1    May 19, 2005

(30) Foreign Application Priority Data

Oct. 21, 2003    (JP) ............... 2003-360227

(51) Int. Cl.
*G11B 5/60*    (2006.01)
(52) U.S. Cl. ............... 360/236.3; 360/235.2; 360/235.3; 360/235.7; 360/235.5
(58) Field of Classification Search ............ 360/235.7, 360/235.8, 236.2, 236.3, 236.5, 236.6, 236.1, 360/236.8, 236.9, 237, 235.2, 235.3, 235.5
See application file for complete search history.

(56) References Cited

U.S. PATENT DOCUMENTS

| | | | |
|---|---|---|---|
| 6,366,429 B1* | 4/2002 | Stover et al. ............ | 360/236.6 |
| 6,490,134 B2* | 12/2002 | Boutaghou ............... | 360/235.7 |
| 2001/0010613 A1* | 8/2001 | Otsuka ..................... | 360/236.6 |
| 2002/0181153 A1* | 12/2002 | Kang ....................... | 360/236.2 |
| 2002/0196585 A1* | 12/2002 | Ueno et al. ................. | 360/236 |
| 2003/0002218 A1* | 1/2003 | Koishi ..................... | 360/235.6 |
| 2003/0137773 A1* | 7/2003 | Polycarpou et al. ...... | 360/235.8 |
| 2003/0184915 A1* | 10/2003 | Kameyama et al. ...... | 360/235.8 |
| 2004/0032694 A1* | 2/2004 | Sun et al. ................. | 360/236.3 |
| 2004/0130821 A1* | 7/2004 | Ohwe et al. .............. | 360/235.8 |
| 2005/0270697 A1* | 12/2005 | Kohira et al. ............. | 360/236.3 |
| 2006/0007598 A1* | 1/2006 | Kameyama ............... | 360/236.3 |

FOREIGN PATENT DOCUMENTS

| | | |
|---|---|---|
| JP | 10-283622 | 10/1998 |
| JP | 11-16141 | 1/1999 |
| JP | 11-110935 | 4/1999 |
| JP | 2001-35111 | 2/2001 |

* cited by examiner

*Primary Examiner*—Jefferson Evans
(74) *Attorney, Agent, or Firm*—McDermott Will & Emery LLP

(57) ABSTRACT

A head slider is designed to prevent collision against a surface of a disk due to an external impact and the like while a device is in use to avoid damages on an air bearing surface ("ABS") of the head slider and the surface the disk. This is achieved by a structure of the head slider which produces a large positive pressure on a positive dynamic pressure generating section when the head slider comes close to the disk. More specifically, the ABS of the head slider comprises three surfaces of different positional heights, and the positive dynamic pressure generating section having a height equivalent to a mid level surface of the second highest position is provided on a portion of the head slider made of a material of high brittleness at each of locations near both side edges lateral to a tracking width of a magnetic head. In addition, a head mounting pad bearing the magnetic head is so configured that a boundary between a high level surface in the highest position and a mid level surface is asymmetrical with respect to the lateral center of the head slider in a direction of the tracking width of the magnetic head.

18 Claims, 8 Drawing Sheets

HEAD SLIDER WITH POSITIVE DYNAMIC PRESSURE GENERATING SECTION

FIELD OF THE INVENTION

The present invention relates to a floating type head used in a disk drive. In particular, the invention relates to a shape of an air bearing surface (may be referred to hereinafter as "air bearing surface" or "ABS") of a head slider of the floating type head that stays low in floating level and is suitable for high density recording, while achieving a high resistance to impacts and superior reliability. The invention also relates to a disk drive with the same.

BACKGROUND OF THE INVENTION

Referring to FIG. 7, description is provided hereinafter of a shape of an ABS in a head slider of a floating type head used in a disk drive unit of the prior art. FIG. 7(a) is a plan view of the disk drive unit of the prior art as observed from the ABS side, and FIG. 7(b) is a sectional view of the same taken along a line A-A' in FIG. 7(a).

In FIG. 7, ABS 42 of head slider 41 faces a surface of a recording medium formed on a disk (not show in these figures), and it has three surfaces of different heights (i.e., distances from the disk surface), that are first surfaces 45 having a same height as an area around signal converting element 43 such as a magnetic head mounted to head mounting pad 44, second surfaces 46 having a slightly lower height (i.e., larger distance from the disk surface) than first surfaces 45, and third surfaces 47 having an even lower height than second surfaces 46. The disk, which faces ABS 42 of head slider 41, rotates in a direction toward the side where signal converting element 43 is mounted (at the bottom of FIG. 7(a)) from the other side opposite the signal converting element 43 (at the top of FIG. 7(a)), and therefore the rotation of the disk produces an air flow in the direction of arrow 48. This means the side opposite the side where signal converting element 43 is mounted is in a position of an air inflow side, and the side where signal converting element 43 is mounted is at an air outflow side.

When the disk rotates, it produces a viscous flow of the air in the close proximity of the disk surface. Since this viscous flow acts on ABS 42 of head slider 41 to generate a lifting force, signal converting element 43 mounted to head slider 41 floats above the disk surface with a very small clearance.

Main part 49a constituting the air inflow side of ABS 42 of head slider 41 is constructed of a material having comparatively high hardness, and another part 49b including signal converting element 43 at the air outflow side is constructed of $Al_2O_3$ in a manner to embrace signal converting element 43.

Although not shown in FIG. 7, head slider 41 equipped with signal converting element 43 is mounted to one end of a suspension arm (also called a load beam), and ABS 42 of head slider 41 is thrust against the surface of the disk by the suspension arm, as is well known. The disk is connected to and driven by a drive motor, and the airflow generated by rotation of the disk lifts head slider 41 off the surface of the disk when it overcomes the thrusting force. On the other hand, a converting element swing means such as the so called voice coil motor (not shown) provided on one end of a head suspension mechanism (also not shown) bearing the suspension arm drives and controls a position of the suspension arm in a manner so that it records or reproduces data on a given track position of the disk with signal converting element 43.

Description is provided next of some examples of the floating type magnetic head used in a hard disk drive unit and having an air bearing surface ("ABS") designed to alleviate an impact for preventing a magnetic disk from being damaged when the magnetic head clashed against or slides on the magnetic disk.

As one example of such floating type magnetic heads, there is proposed a slider that has a structure comprising edges (i.e., ridge-like portions), each formed with two surfaces consisting of an air bearing surface and another surface, and corners, each formed with three surfaces consisting of the air bearing surface and two other surfaces, wherein the edges and the corners have different radii for their respective curvatures. In other words, the structure of this magnetic head has the slider provided with the air bearing surface, of which the edges formed with two surfaces have a smaller radius of curvature than that of the corners formed with three surfaces. This structure is said to have an effect of alleviating an impact upon contact of the slider with the magnetic disk and improving reliability of the magnetic head because of the air bearing surface having the curvatures around the ridges and the corners that face the magnetic disk (refer to Japanese Patent Unexamined Publication, No. H11-110935, for example).

As another example of the floating type magnetic heads, there is also proposed a head slider of a structure which comprises at least one buffer pad having a chamfered and smoothly rounded surface formed around a corner of a substrate of the head slider or the vicinity thereof. This structure is said to have an effect of avoiding a sharp corner of the head slider from coming in contact to the disk and reducing abrasion of the disk and the head slider even if the head slider collides against the disk, so as to improve resistance to impacts and achieve high reliability of the hard disk drive unit (refer to Japanese Patent Unexamined Publication, No. 2001-35111, for example).

Referring to FIG. 8, description is provided of certain sliders any of which can control a difference in floating height between an inner periphery and an outer periphery of a disk by making good use of dependency of it upon a yaw angle, as other examples of the floating type magnetic head. FIG. 8(a) is a perspective view of such a head slider of the prior art as observed from the ABS side, and FIG. 8(b) is a perspective view of still another head slider of the prior art observed from the ABS side.

For such sliders that can control the difference in floating height between the inner periphery and the outer periphery of the disk by taking advantage of the dependency upon the yaw angle, there is proposed head slider 103 of the structure shown in FIG. 8(a), which comprises dynamic pressure generating sections 102a and 102b for generating a dynamic pressure on their surfaces facing a disk (not shown), and negative pressure generating sections 181a and 181b provided within the same surface at the trailing side relative to the center thereof with respect to a rotating direction of the disk for generating a negative pressure, in order to suppress a decrease in the floating height or a change in the contacting force attributable to a change in the yaw angle during a seeking operation, and to achieve a low floating level of the head or a stable contact with a small loading pressure between the head and the disk. Also proposed is head slider 103 of the structure shown in FIG. 8(b), which comprises at least two dynamic pressure generating sections 102a and 102b having shapes of longer dimensions in a direction generally orthogonal to a rotating direction of a disk (not shown) than dimensions along the rotating direction, and arranged on a surface facing the disk along the rotating direction with a deep channel between them, and first recesses 126a and 126b formed in dynamic pressure generating section 102b located at the trailing side of the rotating direction to provide first raised portions 107a and 107b along the direction generally orthogonal to the rotation direction and second and third raised portions 106a and 106b extending forward in the rotating direction from both side ends of these first raised portions 107a and 107b (refer to Japanese Patent Unexamined Publications, Nos. H10-283622 and H11-16141, for example).

However, any of the above head sliders of the prior art gives rise to a problem that the signal converting element mounted on the head slider comes into abnormally close to a surface of the disk due to instability of a floating posture of the head slider, because there is a difference in circling velocity of the disk relative to the head slider between the inner periphery and the outer periphery of the disk due to the difference in radius when a signal converting element mounted on the head slider makes a seeking operation across the inner periphery and the outer periphery, and variations of the circling velocity depending on a position of the head slider relative to a radial distance of the disk often cause the floating posture of the head slider unstable, and changes in angle of the head slider relative to the direction of airflow also cause the floating posture of the head slider unstable during the seeking operation of the signal converting element. These head sliders also have another shortcoming when they are installed into downsized disk drive units for portable use. That is, if the disk drive unit receives an external disturbance of some kind such as a physical impact and the like, it causes the floating posture of the head slider unstable, thereby making the signal converting element mounted to the head slider come into abnormally close to the disk surface, or the head slider collides against the disk surface, resulting in damages to any of the head slider, the signal converting element and the disk.

Moreover, in the head slider of the structure having the dynamic pressure generating sections for generating a dynamic pressure on the surface facing the disk and the negative pressure generating sections provided within the same surface at the trailing side relative to the center thereof with respect to the rotating direction of the disk for generating a negative pressure, there is also a problem which needs to be solved. That is, since this structure has a protruding pad serving as the dynamic pressure generating section in the central portion at the air outflow side of the ABS of the slider, it is unable to produce the maximum pressure on the element under a given floating position, and this structure is liable to collision of the head slider against the disk due to an external disturbance when the highest surface of the protruding pad comes to a point of the lowest floating height.

Furthermore, there are also other problems in the head slider of the structure comprising at least two of the dynamic pressure generating sections having shapes of longer dimensions in the direction generally orthogonal to the rotating direction of the disk than dimensions along the rotating direction, and arranged on the surface facing the disk along the rotating direction with the deep channel between them, and the first recesses formed in one of the dynamic pressure generating sections located at the trailing side of the rotating direction to provide the first raised portions along the direction generally orthogonal to the rotation direction and the second and third raised portions extending forward in the rotating direction from the both side ends of these first raised portions. In other words, this structure is thought to achieve stability of the floating height of the head slider by pressures produced at both side portions of it when the head slider is lifted to a given floating height. However, if these side portions are designed to produce the pressure at the given floating height, they give rise to the problems that (1) another pressure produced by an area of the element becomes relatively weak, and the element becomes liable to come in contact with the disk, that is, this structure has a poor followability of the element to undulation of the disk surface, and (2) the side portions of the slider are liable to came in contact to the disk when the floating height of the slider changes (i.e., by tilting or rolling).

SUMMARY OF THE INVENTION

The present invention is intended to solve the above problems, and to provide a head slider having such a structure and a shape of ABS surface that produces a positive pressure in an area around a signal converting element when the ABS of the head slider comes abnormally close to a surface of the disk, and thereby the positive pressure generated in an event of receiving an external impact avoids the head slider from coming abnormally close to or colliding against the disk, and prevents the head slider, the signal converting element, as well as the disk from being damaged. The invention also aims to provide a disk drive with such a head slider.

In order to achieve the above objects, the head slider according to this invention is equipped with a signal converting element for recording and/or reproducing data in a discoidal recording medium, and provided with an air bearing surface comprising at least three surfaces of different heights, and a positive dynamic pressure generating section on the bearing surface in the vicinity of each side edge lateral of a tracking width of the signal converting element, wherein the positive dynamic pressure generating section has a positional height between one surface having the highest positional height and another surface having the lowest positional height among the surfaces that compose the air bearing surface, and that the positive dynamic pressure generating section provided in the vicinity of the each side edge lateral of the tracking width of the signal converting element is capable of producing a larger pressure than that generated in the normal state when it receives an impact. Furthermore, the air bearing surface is formed of a material of high brittleness at an air inflow side and another material of low brittleness at an air outflow side, and the positive dynamic pressure generating section is provided at the side that is formed of the material of high brittleness. In addition, the material of high brittleness has a Vickers hardness of 2,000 or higher, and the material of low brittleness has a Vickers hardness lower than 1,900. The positive dynamic pressure generating section is disposed to locations in a symmetrical manner with respect to a line drawn in phantom across the center of the signal converting element, and they have shapes that are symmetrical to each other. Moreover, the positive dynamic pressure generating section may be so formed that a section along a plane in parallel to the air bearing surface is rectangle in shape, and it may also have a notch of any shape of the letter U, the letter V and a rectangle at one side facing the air inflow side.

Because of this structure, the positive dynamic pressure generating section disposed to each of the both side edges of the air bearing surface ("ABS") of the head slider generates a large positive pressure when the head slider receives an impact and the like from the outside and moves closer to the disk surface during recording or reproducing data, thereby providing an advantage of preventing the head slider from colliding against the disk surface and consequent damages to any of the ABS of the head slider and the disk surface.

Also, the head slider of this invention has a structure in which surface roughness of the positive dynamic pressure generating sections is greater than that of one surface that is located at the highest position among the surfaces composing the ABS, and that a degree of surface roughness denoted by "Ra" in peak-to-peak value of the positive dynamic pressure generating sections is expressed by Ra≦3 nm.

This structure increases a squeeze effect produced when the head slider receives an impact and the like from the outside and moves closer to the disk surface. Since the squeeze effect produces a repulsive force, it can provide an advantageous effect of further preventing the head slider from colliding against the disk surface.

Moreover, the head slider of this invention has a structure in which the signal converting element is mounted to the surface having the highest positional height among those that compose the ABS, and the structure further includes a head mounting pad comprising one surface of the highest positional height and another surface of the second highest positional height, wherein a boundary between the highest surface and the second highest surface is formed asymmetrical with respect to the lateral center of the head slider in the direction of tracking width of the signal converting element. In addition, this boundary between the two surfaces of different heights comprises three straight lines, a first line being in parallel with an end surface at the air inflow side of the head slider, a second line in continuity at an obtuse angle to the first line toward the right side of the ABS which is the side near the center of the disk, and a third line also in continuity at an obtuse angle to the first line toward the left side of the ABS which is the other side near the perimeter of the disk, wherein the second line is longer than the third line.

This structure can reduce an adverse influence of variation in pressure of the airflow due to change in position of the head slider with respect to the disk which changes its relative velocity, and thereby it provides an advantageous effect of maintaining the head slider to float steadily.

Furthermore, the head slider of this invention has a structure comprising an airflow control section and a low level surface which adjoins the airflow control section at the air outflow side of the ABS in the direction orthogonal to the tracking width of the signal converting element, and that the airflow control section is formed higher than the adjoining low level surface.

This structure generates a positive pressure on the airflow control section and a mid level surface next to the low level surface by an effect of a squeezing force, when the head slider comes close to the disk due to an external impact. The structure also generates a high squeezing force due to compression of the air at a boundary between the low level surface and the mid level surface, and thereby this structure provides an advantage of controlling variations in floating level of the slider attributable to the impact.

In order to achieve the previously discussed object, a disk drive of this invention comprises a discoidal recording medium, a signal converting element for recording and/or reproducing data on the recording medium, a head slider carrying the signal converting element and having an ABS comprising at least three surfaces of different positional heights, and swing means for positioning the signal converting element mounted on the head slider to a predetermined tracking position, wherein the head slider is provided with a positive dynamic pressure generating section on the ABS in the vicinity of each side edge lateral of the tracking width of the signal converting element, and the positive dynamic pressure generating section has a positional height equivalent to that of one surface having the second highest or below among those surfaces that compose the ABS of the slider. Furthermore, the ABS is formed of a material of high brittleness at an air inflow side and another material of low brittleness at an air outflow side, and the positive dynamic pressure generating section is provided at the side that is formed of the material of high brittleness. The positive dynamic pressure generating section in the vicinity of the each side edge lateral of the tracking width of the signal converting element may be so formed as to produce a larger pressure when it receives an impact than that produced in the normal state. In addition, the positive dynamic pressure generating section may be disposed in locations symmetrical with respect to a line drawn in phantom across the center of the signal converting element, and they may have symmetrical shapes to each other. The positive dynamic pressure generating section may also be formed so that its section along a plane in parallel to the air bearing surface is rectangle in shape, and it may have a notch of any shape of the letter U, the letter V and a rectangle at one side facing the air inflow side.

Because of the above structures, the positive dynamic pressure generating section at each of the both side edges of the ABS of the head slider generates a large positive pressure when the disk drive receives an impact and the like from the outside, thereby providing an advantageous effect of preventing the head slider from colliding against the disk surface and consequent damages to any of the ABS of the head slider and the disk surface. The invention can thus provide the disk drive of high resistance to impact and high reliability.

Also, the disk drive of this invention has a structure in which surface roughness of the positive dynamic pressure generating section is greater than that of a surface that is located at the highest position among the surfaces composing the ABS.

Since this structure increases a squeeze effect produced when the head slider moves close to the disk surface, a repulsive force generated by the squeeze effect prevents the head slider from colliding against the disk surface more effectively when it receives an impact and the like from the outside, and thereby it provides the disk drive with even higher resistance to impacts and higher reliability.

Moreover, the disk drive of this invention has a structure in which the signal converting element is mounted to the surface having the highest positional height among those that compose the ABS of the head slider, and the structure further includes a head mounting pad comprising one surface of the highest positional height and another surface of the second highest positional height, wherein a boundary between the highest surface and the second highest surface is formed asymmetrical with respect to the lateral center of the head slider in the tracking width direction of the signal converting element. In addition, this boundary between the two surfaces of different heights comprises three straight lines, a first line being in parallel with an end surface at the air inflow side of the head slider, a second line in continuity at an obtuse angle to the first line toward the right side of the ABS which is the side near the center of the disk, and a third line also in continuity at an obtuse angle to the first line toward the left side of the ABS which is the other side near the perimeter of the disk, wherein the second line is longer than the third line.

This structure can reduce an adverse influence of variation in pressure of the airflow due to change in position of the head slider with respect to the disk which changes its relative velocity, and maintain steady floating of the head slider. The structure thus provides the disk drive of steady quality with high resistance to impacts and high reliability.

Furthermore, the disk drive of this invention has a structure comprising an airflow control section and a low level surface adjoining the airflow control section at the air outflow side of the ABS in the direction orthogonal to the tracking width of the signal converting element, wherein the airflow control section is formed higher than the adjoining low level surface.

This structure generates a positive pressure on the airflow control section and a mid level surface next to the low level surface by an effect of a squeezing force when the head slider comes close to the disk due to an external impact. The structure also generates a high squeezing force due to compression of the air at a boundary between the low level surface and the mid level surface, thereby suppressing variations in floating level of the slider attributable to the impact. This structure can thus provide the disk drive of steady quality with high resistance to impacts and high reliability.

As discussed above, the head slider and the disk drive equipped with the same according to this invention have the structure, in which the ABS of the head slider comprises three surfaces of different heights, the head slider is provided with the positive dynamic pressure generating section having equivalent height as that of the mid level surface in the vicinity of each of the both side edges lateral of the tracking width of the signal converting element, and the highest surface of the head mounting pad whereon the signal converting element is mounted is shaped asymmetrical with respect to the lateral center of the head slider in the tracking width direction of the signal converting element. In this structure, two positive dynamic pressure generating sections generate a large positive pressure when the disk drive receives an impact and the like from the outside and moves the head slider close to the disk especially during portable use, and this pressure prevents the head slider from colliding against the disk surface. This invention can thus provide an advantageous effect of preventing damages to any of the ABS of the head slider, the signal converting element mounted to the head slider, and the disk surface in which data are recorded. In addition, this structure can stabilize floating of the head slider regardless of the position of the head slider over the disk surface. The invention can improve the resistance to impacts of the disk drive during use and realize high reliability when it is equipped with the head slider having the ABS of the above configuration.

DESCRIPTION OF THE PREFERRED EMBODIMENTS

Description will be provided hereinafter of the best modes to carry out the present invention with reference to the accompanying drawings.

First Exemplary Embodiment

Figure 1:
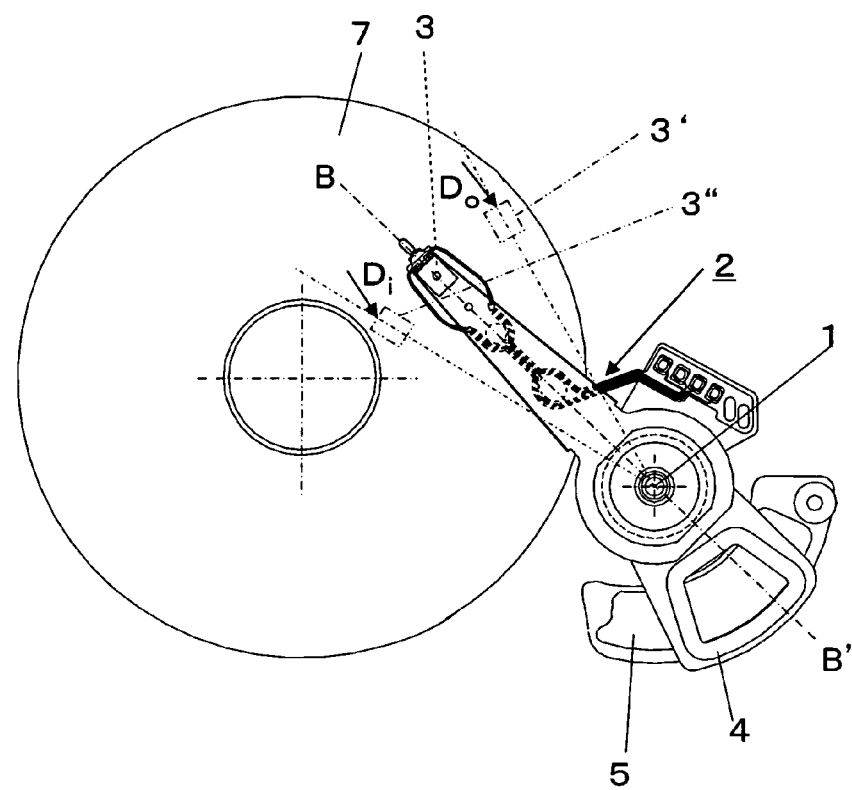
FIG. 1(a) is a plan view illustrating a structure of a major portion of a disk drive according to a first exemplary embodiment of the present invention.
FIG. 1(b) is a sectioned view of the disk drive along a line B-B' shown in FIG. 1(a)
Figure 1:
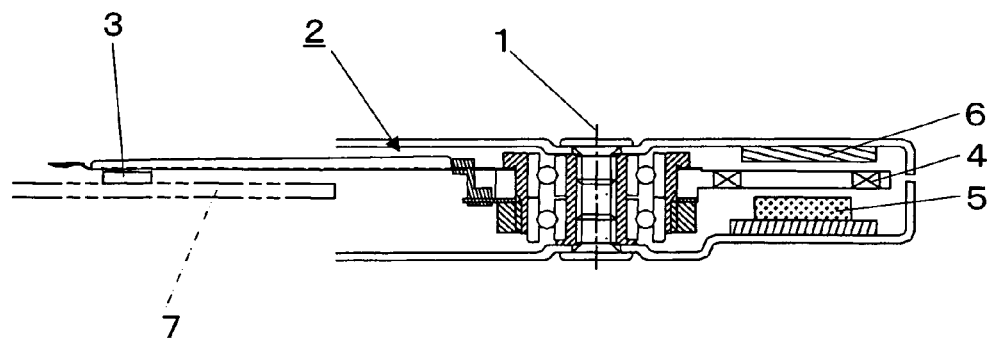
Figure 2:
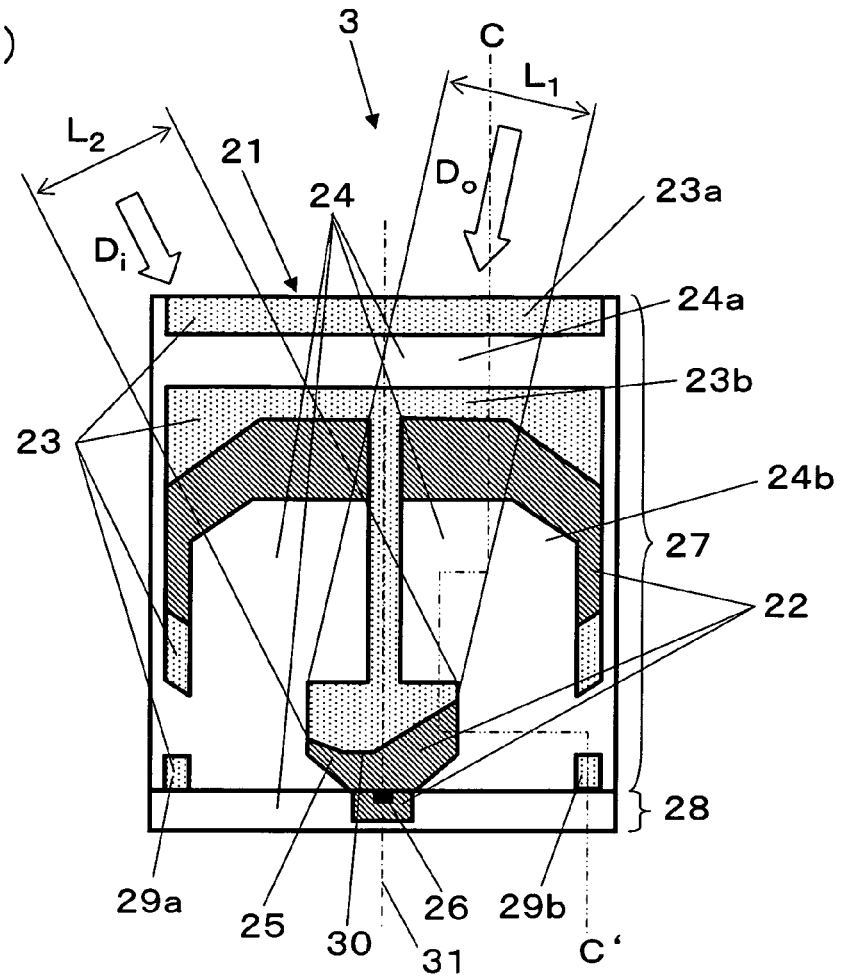
FIG. 2(a) is a plan view of a head slider according to the first exemplary embodiment of the present invention, as is observed from one side facing a disk.
FIG. 2(b) is a schematic view of the head slider sectioned along a line C-C' shown in FIG. 2(a)
Figure 2:
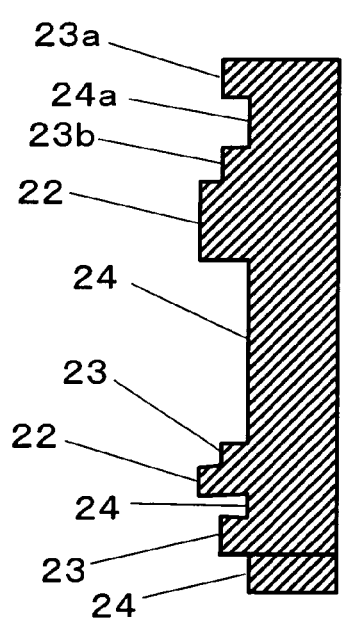
Figure 3:
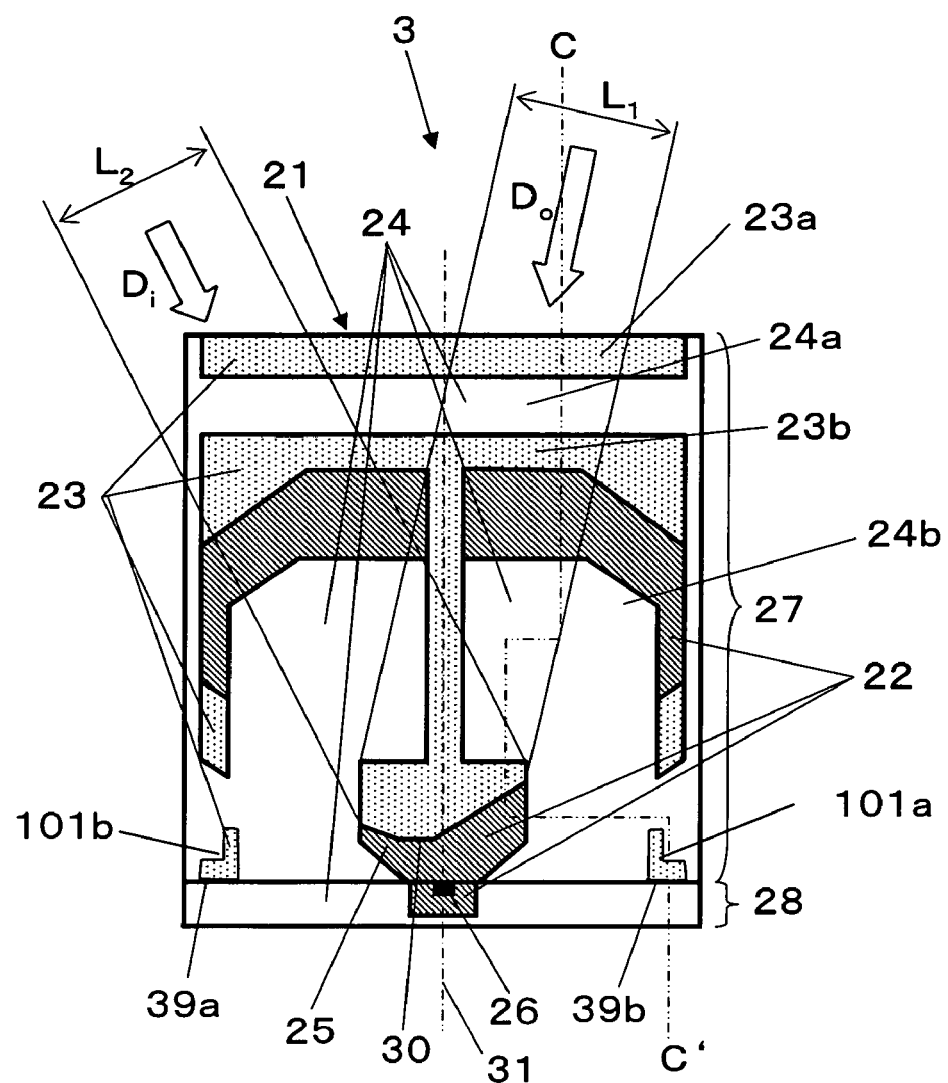
FIG. 3 is a plan view of another head slider used for a disk according to the first exemplary embodiment of the present invention, as is observed from one side facing the disk.

FIG. 1 and FIG. 2 are drawings used to illustrate a disk drive unit and a head slider equipped in the disk drive unit according to the first exemplary embodiment of the present invention. FIG. 1(a) is a plan view illustrating a structure of a major portion of the disk drive unit according to the first exemplary embodiment of the present invention, FIG. 1(b) is a sectioned view of the disk drive unit along a line B-B' shown in FIG. 1(a), FIG. 2(a) is a plan view of a head slider according to the first exemplary embodiment, as observed from one side facing a disk, and FIG. 2(b) is a schematic view of the head slider sectioned along a line C-C' shown in FIG. 2(a). Also, FIG. 3 is a plan view of another head slider used for a disk according to the first exemplary embodiment of the present invention, as is observed from one side facing the disk. In the following discussion, a magnetic disk unit such as a hard disk drive is used as an example for representing the disk drive unit.

In FIG. 1, head suspension mechanism 2 constructed in a rotatable manner around spindle 1 is provided at one end with head slider 3 equipped with a magnetic head or a signal converting element (not shown in the figures), which is mounted by means such as a gimbals mechanism (not shown), and converting element swing means such as voice coil 4 at the other end. There are permanent magnet 5 and upper yoke 6 mounted to a substrate or an enclosure body of the disk unit in a manner to sandwich the converting element swing means such as voice coil 4 provided on head suspension mechanism 2, to compose swing means, or a voice coil motor for instance, as is the well-known art. Head slider 3 attached to head suspension mechanism 2 is disposed in a manner to confront rotatable disk 7 having a recording medium formed on a surface thereof and connected to a drive motor (not shown). Rotation of disk 7 produces an airflow on the surface of disk 7 due to viscosity of the air which lifts head slider 3 above the surface of disk 7. At the same time, the swing means such as the voice coil motor moves head slider 3 to make a seeking operation over the surface of disk 7 to record and reproduce data signals to and from the recording medium formed on the surfaces of disk 7. In FIG. 1, although head slider 3 is shown as being confronting only the upper surface of disk 7 provided in the magnetic disk unit, there can be two units of head slider 3, each confronting both the upper and lower surfaces of disk 7, and the magnetic disk unit may be provided with two or more sets of disk 7 instead of one as shown here.

Description is provided next of an ABS of a head slider equipped with a magnetic head. A head slider having an ABS can be manufactured by a method which comprises the steps of forming a plurality of magnetic heads on a wafer made of a composite material of comparatively high hardness, i.e., a Vickers hardness of 2,000 or higher and high brittleness such as $Al_2O_3$—TiC, for instance, coating the upper surface of it with an insulating protective layer of a material of comparatively low brittleness having a Vickers hardness lower than 1,900 such as $Al_2O_3$, cutting it into pieces of predetermined dimensions, and making a predetermined process on one side surface where a head gap is formed in the magnetic head for each of the cut pieces. Since the above method is the well known technique, details of it are skipped here.

Figure 4A:
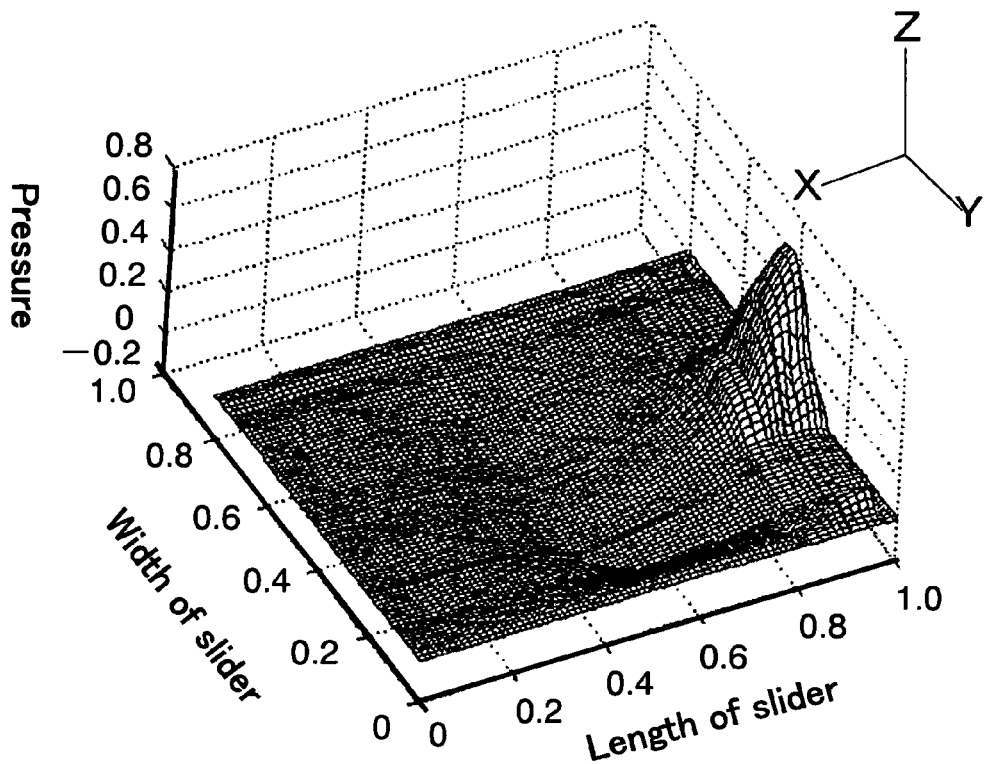
FIG. 4(a) and FIG. 4(b) are graphical representations showing distributions of pressure generated by a positive dynamic pressure generating section when the head slider is afloat by rotation of the disk.
Figure 4B:
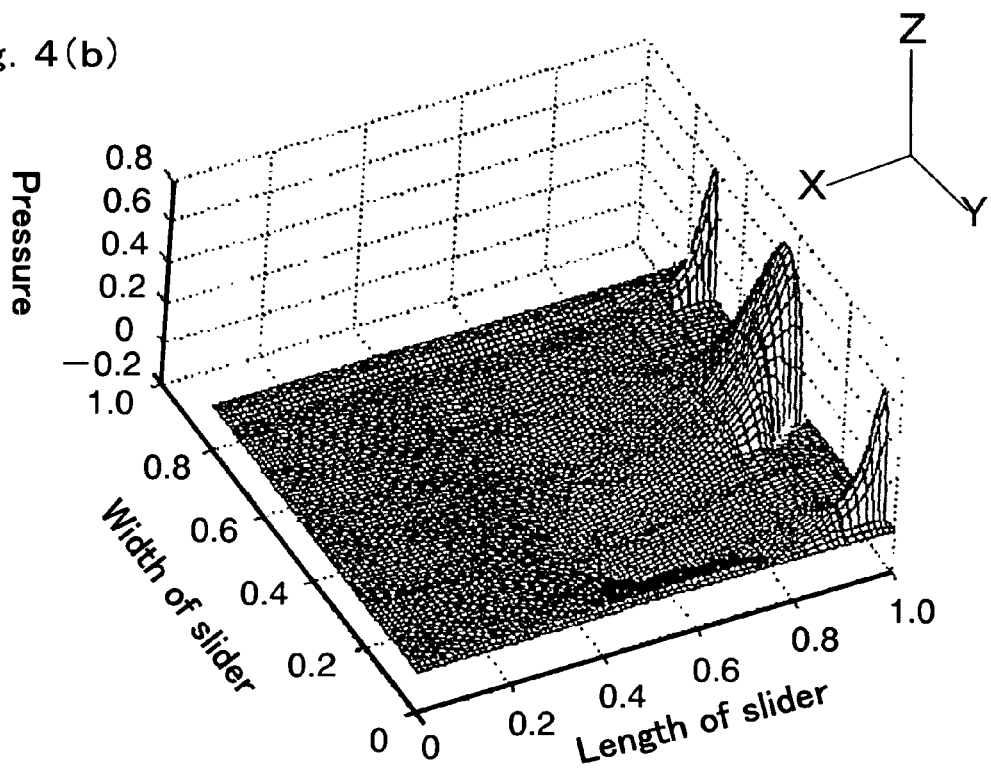

In FIG. 2, ABS 21 of head slider 3, or the surface confronting a disk (not shown) comprises three surfaces of different height positions, that are, high level surface 22 located at the highest position, mid level surface 23 located at the second highest position, and low level surface 24 located at the lowest position. An airflow produced by rotation of the disk is in a tangential direction of the disk. Head mounting pad 25 located at generally the center of ABS 21 in a direction orthogonal to the airflow direction near the air outflow side edge comprises high level surface 22 and mid level surface 23, and a tip of magnetic head 26 protrudes on high level surface 22. Head slider 3 comprises part 27 made of a material of comparatively high brittleness at the air inflow side and part 28 of another material of comparatively low brittleness at the air outflow side, and it has two positive dynamic pressure generating sections 29a and 29b of the same height as mid level surface 23 at locations in the vicinity of the both sides orthogonal to the airflow direction, or a direction along a tracking width of magnetic head 26, on the part 27 made of the material of high brittleness near the side where this part 27 is bonded to part 28 of the material of low brittleness. FIG. 4 is a graphic representation showing distribution of pressure generated by the positive dynamic pressure generating sections when the head slider is lifted by rotation of the disk, and this represents a data obtained through a simulation. Although what is shown in FIG. 4(a) is a positive pressure generated by positive dynamic pressure generating sections 29a and 29b, a larger amount of positive pressure than that generated under the stable position is produced on the positive dynamic pressure generating sections 29a and 29b, as shown in FIG. 4(b), when the posture of head slider 3 is changed or head slider 3 is shifted toward the disk surface as a result of receiving an external impact and the like while the device is being used. Provision of the two positive dynamic pressure generating sections 29a and 29b, each at the respective side can generate the positive pressure on the both sides of the pad, and prevent the head slider 3 from colliding against the disk surface. Accordingly, this structure can prevent any of ABS 21 of head slider 3 and the disk surface from being damaged. In addition, mid level surfaces 23 including positive dynamic pressure generating sections 29a and 29b in the second highest position are so formed that a surface roughness thereof is larger (i.e., rougher) than that of high level surface 22 in the highest position, since the larger the surface roughness of head slider 3 the greater the squeeze effect produced when head slider 3 receives an external impact, moves and comes close to the disk surface. Thus, there occurs a repulsive force on positive dynamic pressure generating sections 29a and 29b by the squeeze effect, and this force can also prevent collision of the head slider 3 against the disk. In order to increase the squeeze effect, it is desirable to satisfy the expression of $Ra \geq 3$ nm in peak-to-peak value, where "Ra" denotes the surface roughness.

In this embodiment, although a composite ceramic made of $Al_2O_3$—TiC having the Vickers hardness ("HV") of 2,000 is used as the material of comparatively high hardness and high brittleness, the present invention should not be considered restrictive to this material. It is desirable that the material used has a high hardness exceeding 2,000 in the value of Vickers hardness and a high brittleness. Although another material made of $Al_2O_3$ having the Vickers hardness ("HV") of 1,900 is used as the material of comparatively low brittleness, the present invention should not be considered restrictive to this material. Furthermore, a distance between the two positive dynamic pressure generating sections 29a and 29b needs to be widened to have a largest possible effect of reducing shift of head slider 3 in a rolling direction by making good use of the generated positive dynamic pressure. In addition, since dynamic pressure generating sections 29a and 29b provided in the vicinity of the air outflow side of the head slider maintain a narrower clearance between them and the disk surface than that at the air inflow side, they can increase the effect of generating the positive dynamic pressure. In the above structure of head slider 3, what has been illustrated is an example in which the two positive dynamic pressure generating sections 29a and 29b of the same height as mid level surface 23 are provided in the vicinity of the both sides orthogonal to the airflow direction, or the direction of tracking width of magnetic head 26, on part 27 made of the material of high brittleness near the side where this part 27 is bonded to part 28 of the material of low brittleness, as shown in FIG. 2(a). The shape of positive dynamic pressure generating sections 29a and 29b needs not be limited to the hexahedron as shown. The part 27 of the material of high brittleness may instead be provided with positive dynamic pressure generating sections 39a and 39b which have L-shaped surface 101a and reversed L-shaped surface 101b respectively by cutting portions of their hexahedral shape near the both ends in the direction orthogonal to the airflow direction, or the direction of tracking width of magnetic head 26, as shown in FIG. 3. These positive dynamic pressure generating sections 39a and 39b also have the same height as mid level surface 23. Since positive dynamic pressure generating sections 39a and 39b receive the flow of air at the L-shaped surface 101a and reversed L-shaped surface 101b respectively, they yield a larger effect of compressing the air flowing therein than that of positive dynamic pressure generating sections 29a and 29b shown in FIG. 2(a).

Besides the hexahedron, the L-shape and the reversed L-shape, the positive dynamic pressure generating sections may also be formed into such a configuration that has a notch of any shape of a rectangular recess, the letter U and the letter V, as viewed vertically from the above upon their surfaces at one side orthogonal to the airflow direction of the part 27 of the material of high brittleness, i.e. the surfaces facing perpendicular to the air inflow side of mid level surfaces 23 provided in the vicinity of the both sides lateral of the tracking width of magnetic head 26, to obtain the similar effect of compressing the air flowing to the dynamic pressure generating sections, although not shown in any of the drawings.

Figure 5A:
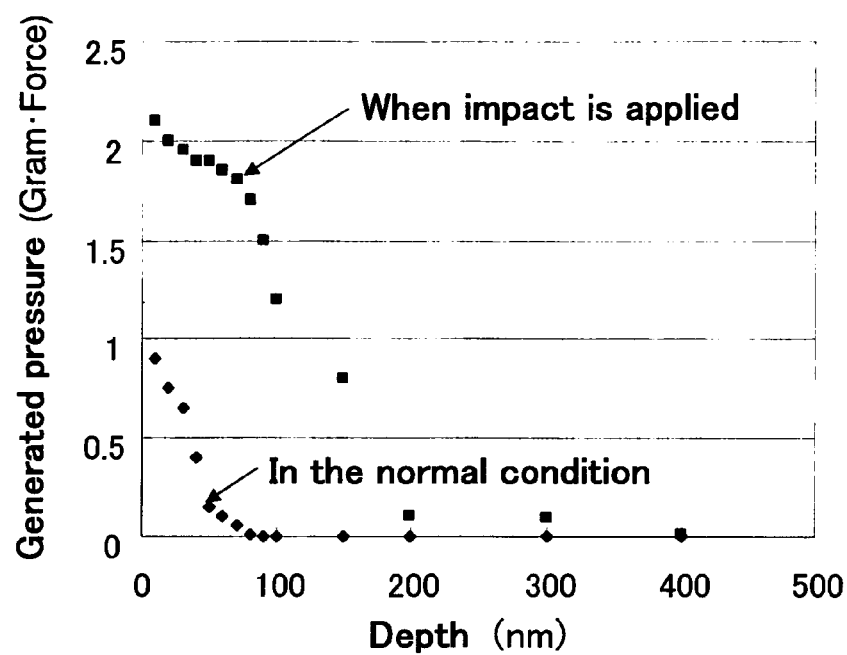
FIG. 5(a) is a graphical representation showing changes in force affecting on the slider in relation to height position of the positive dynamic pressure generating section when a disk drive with the head slider according to the first exemplary embodiment of this invention as illustrated in FIG. 2(a) is in the normal operation and when it receives an impact.
Figure 5B:
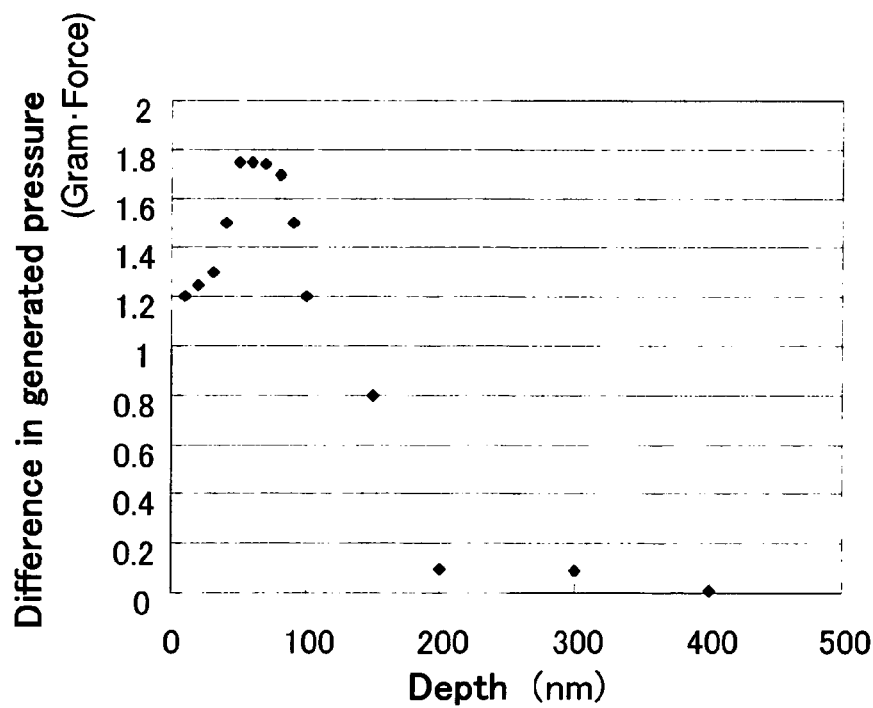
FIG. 5(b) is a graphical representation showing changes in difference of force affecting on the slider in relation to the height position of the positive dynamic pressure generating sections when the slider is in the normal operation and when it receives the impact, as shown in FIG. 5(a)

Referring now to FIG. 5, description is provided more concretely of the force which acts upon the head slider when an impact is applied to the slider during operation. FIG. 5(*a*) is a graphical representation showing changes in the force affecting upon the head slider provided in a disk drive unit of the first exemplary embodiment of this invention as illustrated in FIG. 2(*a*), when an impact is applied to it as opposed to the normal operation, that is, it shows a difference in the generated pressure in relation to height position of the positive dynamic pressure generating sections. FIG. 5(*b*) is a graphical representation showing changes in difference of force affecting upon the slider in relation to the height position of the positive dynamic pressure generating sections when the slider receives the impact as opposed to the normal operation shown in FIG. 5(*a*).

In FIG. 5(*a*), "the normal condition" means a condition in which head slider 3 shown in FIG. 2 having a suspension weight of 3 mg is afloat at a height of 10 nm from the surface of disk 7 while it is in the normal operating state. The graph is plotted according to forces generated by positive dynamic pressure generating sections 29*a* and 29*b* during this state with respect to depths of height difference of positive dynamic pressure generating sections 29*a* and 29*b* (this height difference corresponds to a difference in height between the positional height of head mounting pad 25 bearing the magnetic head (i.e., high level surface 22) and the positional height of positive dynamic pressure generating sections 29*a* and 29*b* (i.e., mid level surface 23). A remark of "when impact is applied" means a condition in which an impact of 1,000 G is impressed upon the disk drive unit while head slider 3 shown in FIG. 2 having the suspension weight of 3 mg is afloat at the normal height of 10 nm from the surface of disk 7. The graph is plotted according to forces generated by positive dynamic pressure generating sections 29*a* and 29*b* when the floating height is decreased during a moment of the impact with respect to the same depths of height difference. FIG. 5(*b*) shows differences between the forces generated on positive dynamic pressure generating sections 29*a* and 29*b* at the both sides of head slider 3 when head slider 3 is in the normal condition and the forces generated when the floating height of head slider 3 is decreased due to the impact, as are show in FIG. 5(*a*), in relation to the depths of height difference.

It is apparent from FIG. 5(*a*) that if the depth of height difference is zero, the forces generated on positive dynamic pressure generating sections 29*a* and 29*b* under the normal condition when head slider 3 is afloat at a prescribed height is smaller than the forces generated when the disk drive receives the impact and the floating height of head slider 3 is decreased. In general, the forces generated on positive dynamic pressure generating sections 29*a* and 29*b* increases when the floating height of head slider 3 is decreased due to the impact than the forces generated when head slider 3 is afloat at the prescribed posture and height. Since a force generated by either one of positive dynamic pressure generating sections 29*a* and 29*b* increases especially when head slider 3 losses a right-to-left balance due to a rolling motion in which it tilts toward one side with respect to center line 31, this structure can solve the shortcoming of the prior art device in which head slider 3 is liable to come into contact to disk 7 at its one side even if it makes a rolling motion as a result of external disturbance affecting on head slider 3, including an impact. This structure also improves substantially the followability of the head slider to undulation of the disk surface.

On the other hand, the forces of pressure generated on positive dynamic pressure generating sections 29*a* and 29*b* decrease under the both conditions when head slider 3 is lifted to the prescribed height and when it receives an impact, if the depth of height difference is increased. However, this structure still maintains the relation that the forces of pressure generated on positive dynamic pressure generating sections 29*a* and 29*b* are greater when there is an impact than in the normal operating condition.

The difference in the pressure generated on positive dynamic pressure generating sections 29*a* and 29*b* between the normal operating condition and when being subjected to an impact increases to its maximum value when the depth of height difference is in the proximity of 60 nm, and starts decreasing when the depth of height difference becomes larger, as shown in FIG. 5(*b*).

This structure provides the highest resistance to impacts when the depth of height difference corresponding to the difference in positional height between the magnetic head (i.e., high level surface 22) and positive dynamic pressure generating sections 29*a*, and 29*b* (i.e., the mid level surface) is in the proximity of 60 nm, and therefore it can effectively reduce collisions between the head slider (or the magnetic head) and the disk even when it receives any impact.

Figure 6:
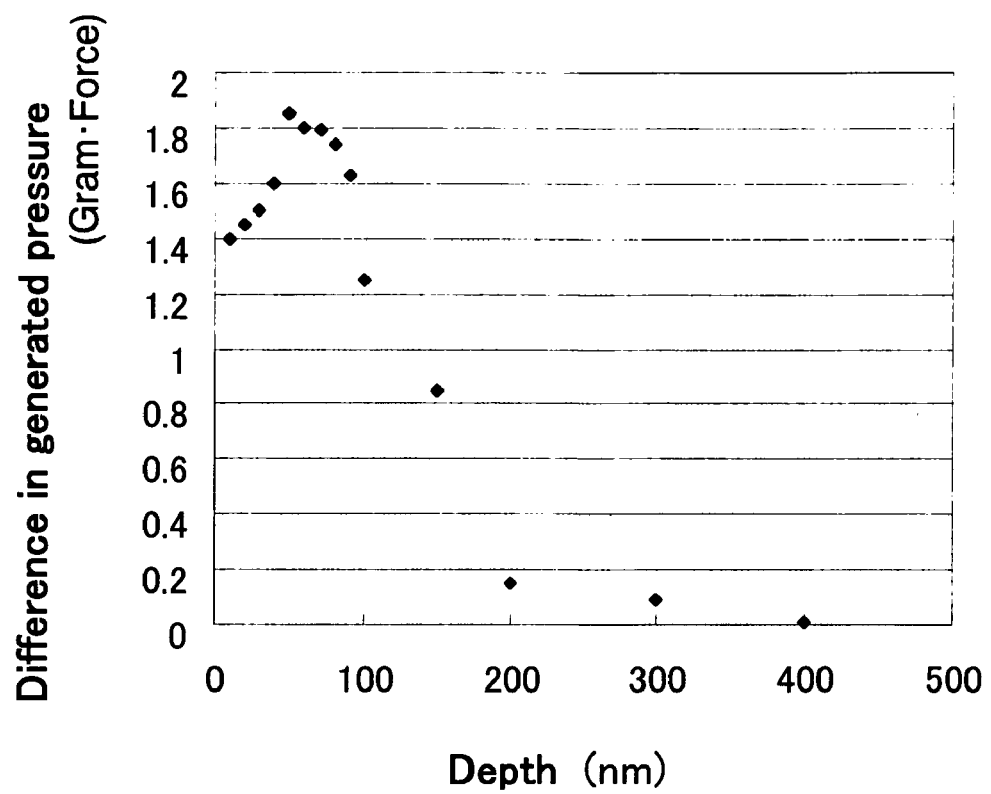
FIG. 6 is a graphical representation showing changes in difference of force affecting on another slider shown in FIG. 3 in relation to the height position of the positive dynamic pressure generating sections when the slider is in the normal operation and when it receives the impact.
Figure 7A:
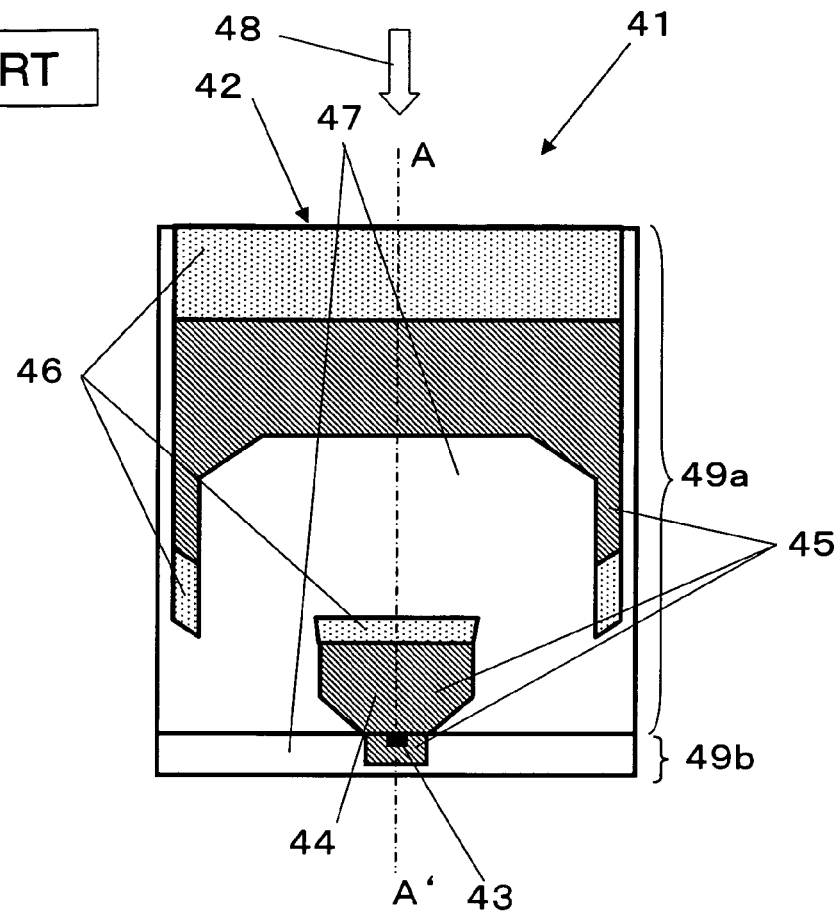
FIG. 7(a) is a plan view of a head slider of the prior art as observed on an ABS side.
Figure 7B:
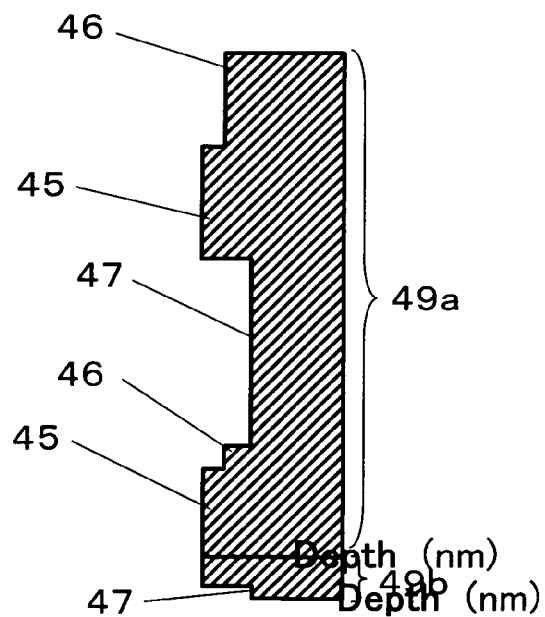
FIG. 7(b) is a sectional view along a line A-A' shown in FIG. 7(a)
Figure 8A:
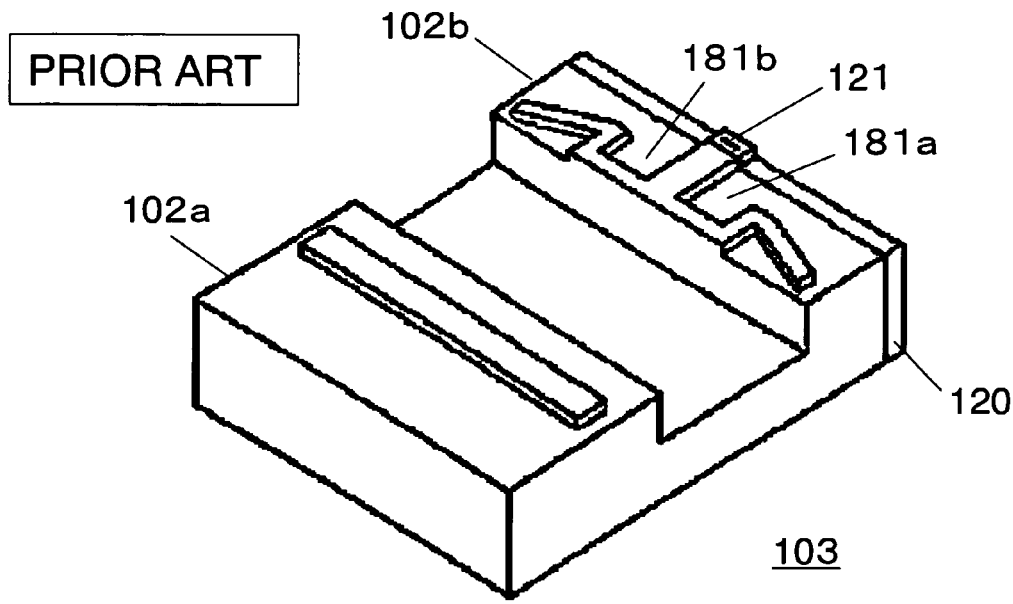
FIG. 8(a) is a perspective view of another head slider of the prior art as observed on an ABS side.
Figure 8B:
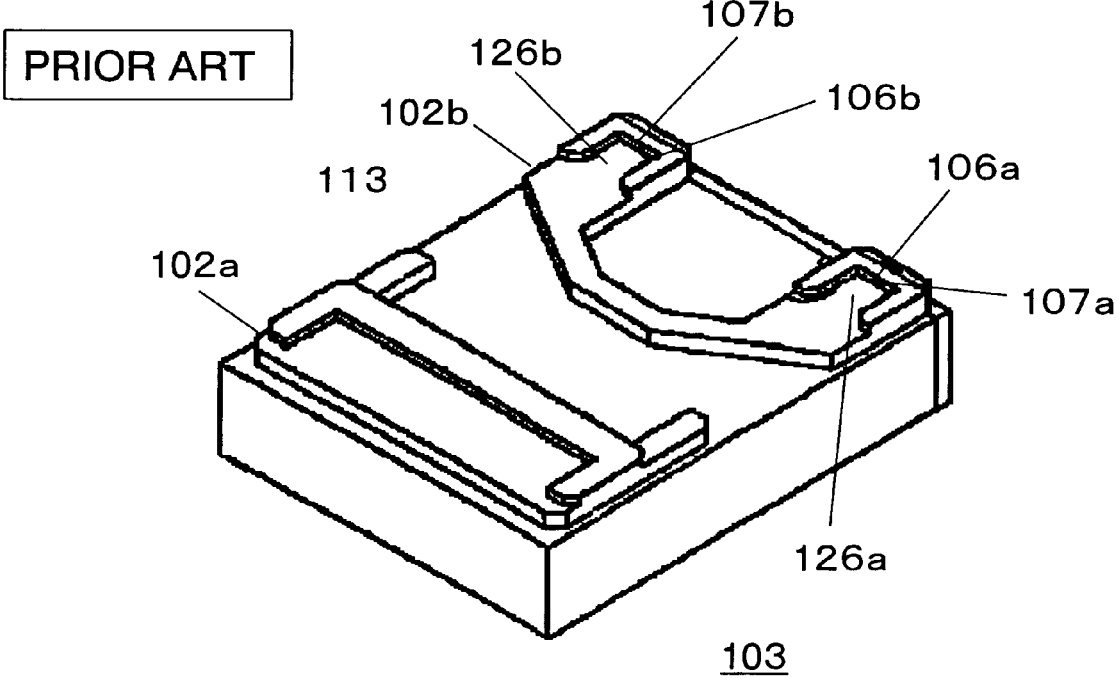
FIG. 8(b) is a perspective view of still another head slider of the prior art as observed on an ABS side.

In addition, head slider 3 provided with positive dynamic pressure generating sections 39*a* and 39*b* having L-shaped surface 101*a* and reversed L-shaped surface 101*b*, as shown in FIG. 3, also demonstrates a similar relation in the forces affecting on head slider 3 when it is in the normal operating condition and when being subjected to an impact. FIG. 6 is a graphical representation showing changes in difference of the force affecting on head slider 3 shown in FIG. 3 in relation to the height position of the positive dynamic pressure generating sections when the slider is in the normal operation and when it is subjected to the impact. In this case, however, head slider 3 provided with positive dynamic pressure generating sections 39*a* and 39*b* having L-shaped surface 101*a* and reversed L-shaped surface 101*b* respectively as shown in FIG. 3 is adjusted to generate pressure of identical values as those of the normal condition in FIG. 5(*a*), when head slider 3 having a suspension weight of 3 mg is lifted to a height of 10 nm from the surface of disk 7 when it is in the normal operating state. It is known from FIG. 6 that difference in the pressures generated on positive dynamic pressure generating sections 39*a* and 39*b* having L-shaped surface 101*a* and reversed L-shaped surface 101*b* respectively as shown in FIG. 3 is larger than that of positive dynamic pressure generating sections 29*a* and 29*b* having the hexahedral shape shown in FIG. 2(*a*).

This is because L-shaped surface 101*a* and reversed L-shaped surface 101*b* provides a greater effect of compressing the air flowing against positive dynamic pressure generating sections 39*a* and 39*b*, and thereby they generate a higher pressure when there is a change in the floating height of head slider 3. This structure thus provides a greater effect of preventing collisions between head slider 3 (or the magnetic head) and disk 7 when it receives an influence of impact.

In any of head sliders 3 shown in FIG. 2 and FIG. 3, as provided in the disk drive unit of the first exemplary embodiment of this invention, a part that composes mid level surface 23 at the air inflow side represents airflow control section 23a. This airflow control section 23a is higher in position than low level surface 24a adjoining thereto at the air outflow side in the direction orthogonal to the tracking width direction of magnetic head 26, so that it restricts an amount of the air flowing through ABS 21. Although there is a small negative pressure generated on low level surface 24a adjoining airflow control section 23a as the air flowing in there is opened, this negative pressure is cancelled out by a positive pressure generated when the air is compressed on mid level surface 23b adjoining low level surface 24a at the air outflow side in the direction orthogonal to the tracking width of magnetic head 26. When head slider 3 comes close to disk 7 due to an effect of impact, there is a positive pressure generated by a squeezing force on mid level surface 23b adjoining airflow control section 23a and low level surface 24a. In addition, a high squeezing force is generated by compression of the air at low level surface 24a and a surface at the boundary between low level surface 24a and mid level surface 23b, thereby restricting a change in floating height of head slider 3 attributable to the impact. In FIG. 2, although airflow control section 23a is shown as being in the same plane as mid level surface 23, this is not restrictive. Airflow control section 23a can provide the intended function so long as it has a height higher than the adjoining low level surface 24a at the air outflow side in the direction orthogonal to the tracking width direction of magnetic head 26.

The reduction in size and weight of these devices in recent years has increased occasions for them to be used while being carried, thereby resulting in more chances of receiving external shocks and impacts. The provision of two positive dynamic pressure generating sections 29a and 29b (or 39a and 39b) at respective sides of ABS 21 of head slider 3 can improve resistance to the shocks and impacts which is very effective when the devices are being used, especially for the devices being hand-carried.

A direction of the airflow acting upon head slider 3 to make it afloat differs depending on a position of head slider 3 with respect to disk 7, as is apparent from FIG. 1. The air flows in a direction of arrow "Do" shown in FIG. 2(a) (this direction is opposite to that of FIG. 1 with respect to a line B-B' because the drawing of FIG. 2(a) is viewed from the side of ABS 21) when head slider 3 is in an outer peripheral portion (e.g., a position of head slider 3 shown by mark 3') within the recordable area of disk 7. On the other hand, the air flows in a direction of arrow "Di" shown in FIG. 2(a) when head slider 3 is in an inner portion (e.g., a position of head slider 3 shown by mark 3") within the recordable area of disk 7. In addition, a relative velocity of disk 7 with respect to head slider 3 also differs depending on a position of head slider 3 in the radial direction of disk 7, such that it becomes faster as head slider 3 moves toward the outer periphery, and a pressure of the airflow produced by the rotation of disk 7 becomes larger at the outer peripheral portion. Because of the above reasons, boundary 30 between high level surface 22 and mid level surface 23 of head mounting pad 25 on which magnetic head 26 is mounted is configured asymmetrical with respect to center line 31 across the width of head slider 3 in the direction of the tracking width of magnetic head 26. That is, projected length "$L_2$" of high level surface 22 on head mounting pad 25 in the direction of arrow "Di" is longer than projected length "$L_1$" of the same high level surface 22 in the direction of arrow "Do". This means that boundary 30 formed between high level surface 22 and mid level surface 23 of head mounting pad 25 comprises three straight lines, a first line being in parallel with the end surface at the air inflow side of head slider 3, a second line in continuity at an obtuse angle to the first line toward the right side of the ABS which is the side near the center of the disk (i.e., the line confronting "Di"), and a third line also in continuity at an obtuse angle to the first line toward the left side of the ABS which is the other side near the perimeter of the disk (i.e., the line confronting "Do"), wherein the second line near the center of the disk is longer than the third line near the perimeter of the disk. By differentiating the projected length "$L_1$" of high level surface 22 on head mounting pad 25 in the direction of arrow "Do" from the projected length "$L_2$" in the direction of arrow "Di", this structure achieves stable floating of head slider 3 regardless of the position of it with respect to disk 7.

Furthermore, mid level surface 23b is so configured that it divides high level surface 22 along center line 31 of head slider 3, and extended from the air inflow side to head mounting pad 25 at the air outflow side.

Mid level surface 23b divides a negative pressure (i.e., a force acting to bring the head slider toward the disk) generated on low level surface 24b into two portions at the lateral sides of head slider 3, and it can suppress a difference of the negative pressures between the right side and the left side of head slider 3 when head slider 3 vibrates in the vertical direction. The height of mid level surface 23b as being in the medium height position also suppresses generation of a positive pressure on this surface. Moreover, head slider 3 is so configured that high level surface 22 has angled portions in the boundary of it with mid level surface 23b at the air inflow side to suppress variations in the floating height between the inner periphery and the outer periphery of disk 7.

In the above embodiment, although description has been given of the example of magnetic disk unit, this shall not be considered restrictive, and the invention can be embodied in other ways including application to read write disk devices of non-contact type such as magneto-optical disk devices, optical disk devices and the like, as is needless to state.

According to the first exemplary embodiment of the present invention as discussed above, the head slider produces a large positive pressure on the positive dynamic pressure generating sections provided at the both sides of the ABS when the head slider shifts toward the disk surface side and comes closer to the disk surface due to an external impact when the device is being used, or during recording and/or reproducing. The positive pressure prevents the head slider from colliding against the disk surface, and avoids damages to the ABS of the head slider and the surface of the disk. In addition, this embodiment can also maintain a stable floating posture of the head slider regardless of its position in the recordable area on the disk. Furthermore, this invention can substantially improve follow-ability of the head slider to undulation of the disk since the head slider is not liable to come in contact to the disk at any side of it even if the head slider makes a rolling motion due to the external turbulences including shocks and impacts.

When equipped in a disk drive unit, this head slider improves the resistance to shocks and impacts when the unit is being carried for use, and provides the disk drive unit of high reliability.

The head slider and the disk drive unit equipped with the head slider according to the present invention has the ABS comprising three surfaces of different heights, and the positive dynamic pressure generating sections having the same height as that of the mid level surface in the vicinity of both side edges in the lateral direction of the tracking width of the signal converting element, wherein the shape of ABS, or the high level surface in the head mounting pad equipped with the head, is configured asymmetrical with respect to the center line of the width of the head slider in the direction of the tracking width of the signal converting element. This structure of the head slider produces a large positive pressure on the two positive dynamic pressure generating sections when the head slider comes closer to the disk due to an external impact when the disk drive unit is being used, especially when it is being hand-carried, and this positive pressure prevents the head slider from colliding against the disk surface. The structure can thus prevent damages to the ABS of the head slider, the signal converting element mounted to the head slider and the disk surface where data are recorded. In addition, the structure can also stabilize the floating posture of the head slider regardless of its position on the disk. When equipped in a disk drive unit, the head slider having the ABS of the above configuration can improve the resistance to shocks and impacts when the unit is being used, and provide the disk drive unit of high reliability. Accordingly, the head slider of this invention is adaptable to any disk drive unit including magnetic disk device, optical disk device and magneto-optical disk device provided with a signal converting element of the floating type such as a magnetic head and an optical head.

What is claimed is:

1. A head slider equipped with a signal converting element for recording and/or reproducing data in a discoidal recording medium, the head slider having an air bearing surface comprising at least three surfaces of different heights, and a positive dynamic pressure generating section on the bearing surface in the vicinity of each side edge lateral of a tracking width of the signal converting element,
    wherein the positive dynamic pressure generating section has positional height between one surface having the highest positional height and another surface having the lowest positional height among the surfaces composing the air bearing surface, and
    wherein the air bearing surface is formed of a material of high brittleness at an air inflow side and another material of low brittleness at an air outflow side, and the positive dynamic pressure generating section is provided at the side formed of the material of high brittleness.

2. The head slider as set forth in claim 1, wherein the positive dynamic pressure generating section provided in the vicinity of each side edge lateral of the tracking width of the signal converting element is capable of producing a larger pressure when the head slider receives an impact than a pressure produced in the normal state.

3. The head slider as set forth in claim 1, wherein the material of high brittleness has a Vickers hardness of 2,000 or higher, and the material of low brittleness has a Vickers hardness lower than 1,900.

4. The head slider as set forth in claim 1, wherein the positive dynamic pressure generating section has a greater degree of surface roughness than surface roughness of a surface having the highest positional height among the surfaces composing the air bearing surface.

5. The head slider as set forth in claim 4, wherein the degree of surface roughness denoted by "Ra" in peak-to-peak value of the positive dynamic pressure generating sections satisfies the expression of Ra≧3 nm.

6. The head slider as set forth in claim 1, wherein the signal converting element is positioned on the surface having the highest positional height among the surfaces composing the air bearing surface, and the head slider further includes a head mounting pad comprising one surface of the highest positional height and another surface of the second highest positional height, wherein a boundary between the surfaces of the highest positional height and the second highest positional height is formed asymmetrical with respect to the lateral center of the head slider in a direction of the tracking width of the signal converting element.

7. The head slider as set forth in claim 6, wherein the boundary formed between the surfaces of the highest positional height and the second highest positional height comprises three straight lines, a first line being in parallel with an end surface at the air inflow side of the head slider, a second line in continuity at an obtuse angle to the first line toward the right side of the air bearing surface which is the side near the center of the disk, and a third line also in continuity at an obtuse angle to the first line toward the left side of the air bearing surface which is the other side near the perimeter of the disk, wherein the second line is longer than the third line.

8. The head slider as set forth in claim 7 further comprising an airflow control section and a low level surface on the air bearing surface, the low level surface adjoining the airflow control section at the air outflow side in a direction orthogonal to the tracking width of the signal converting element, wherein the airflow control section is formed higher than the adjoining low level surface.

9. The head slider as set forth in claim 1, wherein the positive dynamic pressure generating section is provided at each of locations symmetrical with respect to a line drawn in phantom across the center of the signal converting element, and the positive dynamic pressure generating sections have shapes symmetrical to each other.

10. The head slider as set forth in claim 9, wherein the positive dynamic pressure generating section is rectangle in sectional shape along a plane in parallel to the air bearing surface, and may have a notch of any shape of the letter U, the letter V and a rectangle at one side facing the air inflow side.

11. A disk drive comprising:
    a discoidal recording medium;
    a signal converting element for recording and/or reproducing data in the recording medium;
    a head slider equipped with the signal converting element, the head slider having an air bearing surface comprising at least three surfaces of different positional heights; and
    swing means for positioning the signal converting element mounted on the head slider to a predetermined tracking position,
    wherein the head slider has a positive dynamic pressure generating section on the bearing surface in the vicinity of each side edge lateral of a tracking width of the signal converting element, and
    the positive dynamic pressure generating sections has a positional height equivalent to a surface of the second highest positional height or below among the surfaces composing the air bearing surface of the head slider and
    wherein the air bearing surface of the head slider is formed of a material of high brittleness at an air inflow side and another material of low brittleness at an air outflow side, and the positive dynamic pressure generating section is provided at the side formed of the material of high brittleness.

12. The disk drive as set forth in claim 11, wherein the positive dynamic pressure generating section has a greater degree of surface roughness than surface roughness of a surface having the highest positional height among the surfaces composing the air bearing surface.

13. The disk drive as set forth in claim 11, wherein the signal converting element is mounted to the surface having the highest positional height among the surfaces composing the air bearing surface of the head slider, and the head slider further includes a head mounting pad comprising one surface of the highest positional height and another surface of the second highest positional height, wherein a boundary between the surfaces of the highest positional height and the second highest positional height is formed asymmetrical with respect to the lateral center of the head slider in a direction of the tracking width of the signal converting element.

14. The disk drive as set forth in claim 13, wherein the boundary formed between the surfaces of the highest positional height and the second highest positional height comprises three straight lines, a first line being in parallel with an end surface at the air inflow side of the head slider, a second line in continuity at an obtuse angle to the first line toward the right side of the air bearing surface which is the side near the center of the disk, and a third line also in continuity at an obtuse angle to the first line toward the left side of the air bearing surface which is the other side near the perimeter of the disk, wherein the second line is longer than the third line.

15. The disk drive as set forth in claim 11 further comprising an airflow control section and a low level surface on the air bearing surface, the low level surface adjoining the airflow control section at the air outflow side in a direction orthogonal to the tracking width of the signal converting element, wherein the airflow control section is formed higher than the adjoining low level surface.

16. The disk drive as set forth in claim 11, wherein the positive dynamic pressure generating section provided on the bearing surface in the vicinity of each side edge lateral of the tracking width of the signal converting element is capable of producing a larger pressure when the head slider receives an impact than a pressure produced in the normal state.

17. The disk drive as set forth in claim 11, wherein the positive dynamic pressure generating section is provided at each of locations symmetrical with respect to a line drawn in phantom across the center of the signal converting element, and the positive dynamic pressure generating sections have shapes symmetrical to each other.

18. The disk drive as set forth in claim 17, wherein the positive dynamic pressure generating section is rectangle in sectional shape along a plane in parallel to the air bearing surface, and may have a notch of any shape of the letter U, the letter V and a rectangle at one side facing the air inflow side.

* * * * *